March 23, 1971     R. A. GULICK     3,572,140
HIGH TORQUE MANUAL OPERATOR
Filed March 14, 1969     2 Sheets-Sheet 1
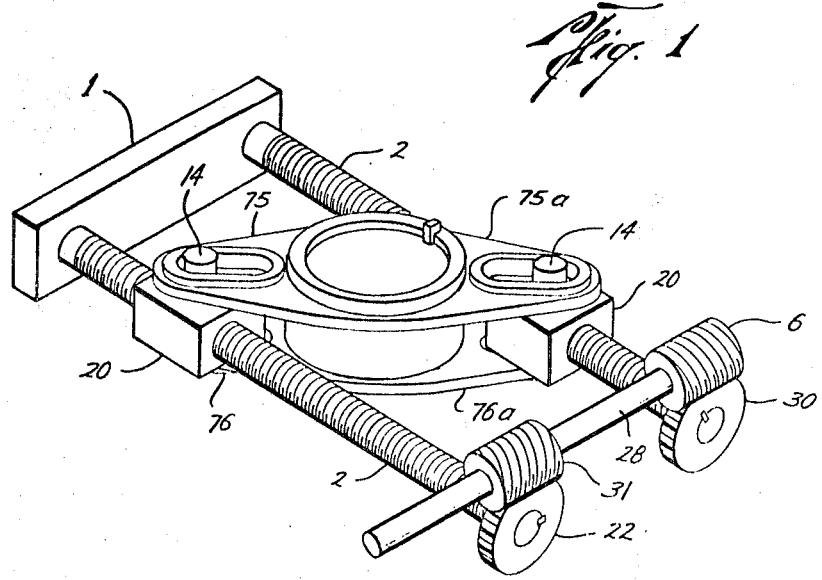
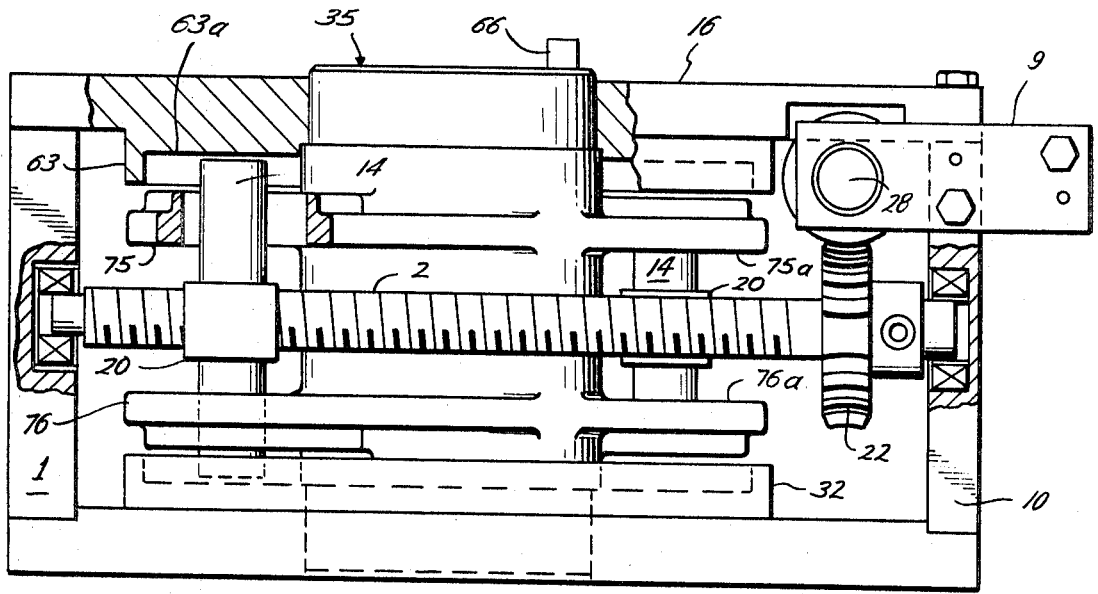
Ronald A. Gulick
INVENTOR.
BY
ATTORNEY

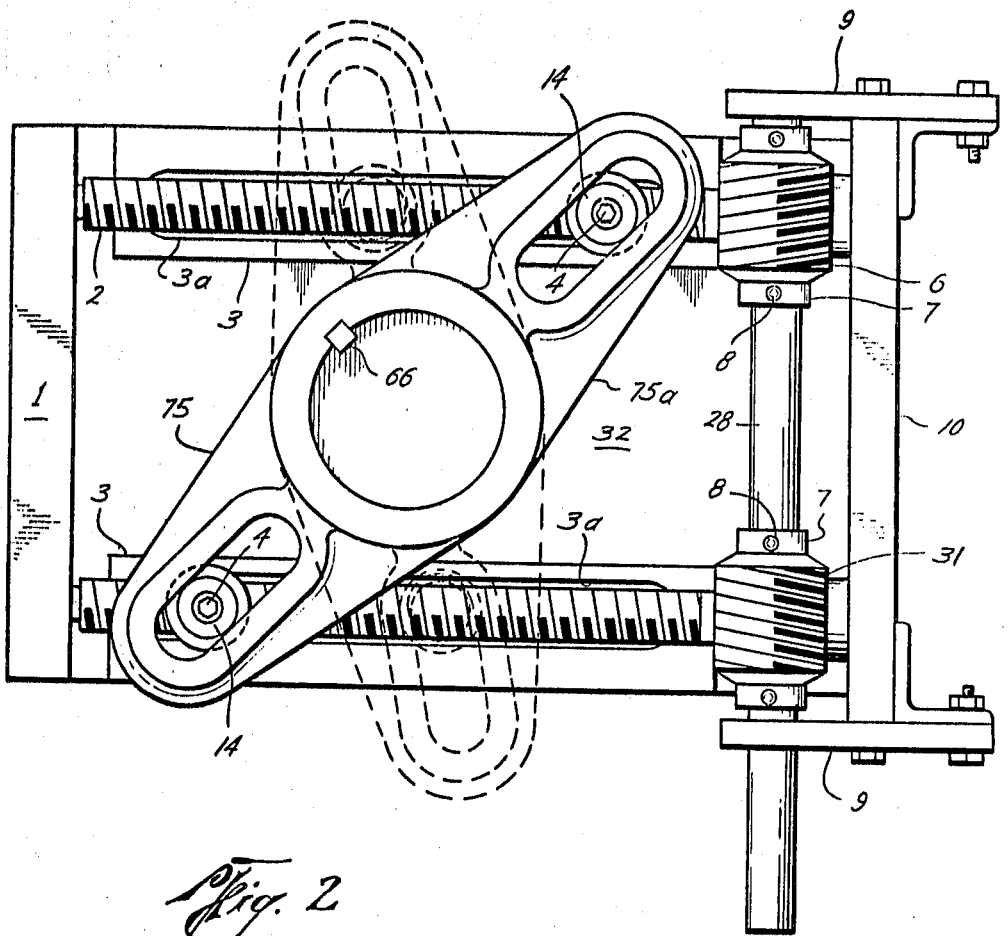

United States Patent Office 3,572,140
Patented Mar. 23, 1971

3,572,140
HIGH TORQUE MANUAL OPERATOR
Ronald A. Gulick, Houston, Tex., assignor to
Research Engineering Corporation
Filed Mar. 14, 1969, Ser. No. 807,346
Int. Cl. F16h *1/18, 27/02*
U.S. Cl. 74—89.15     5 Claims

ABSTRACT OF THE DISCLOSURE

An operator having an output member linked to an input shaft in the following manner. Linkages join the member to nuts that are threadedly engaged to oppositely spaced longitudinal screws, both screws being of the same turn, i.e., right or left handed. Similar ends of the screws are keyed to worm wheels, the wheels being of opposite turn one to the other. The wheels are engaged with dual worms positioned toward opposite ends of a common shaft, the worms being of opposite turns. This shaft serves as an input shaft.

BACKGROUND OF THE INVENTION

(A) Field of the invention

This invention is applicable to the operator field of art, and particularly that area wherein manual or other motive force may be applied to such a device which in turn may cause the turning of a further device such as a valve stem. Oftentimes, for example in the oil industry, it is necessary to rotate bulky valve stems. Relatively compact operators are naturally desirable. It is further desirable that such operators be operable by utilizing available power sources such as pneumatic means or by manual power. It is this area wherein this invention finds particular utility.

(B) Description of the prior art

Numerous operators are depicted in the art of operators or actuators. Exemplary examples may be seen in U.S. Pat. Nos. 3,104,592; 2,983,159; and 2,891,408. However, the prior art does not readily present a system wherein manual operation may occur so as to produce a torsional output on the output member, without the necessity for thrust bearings to resist thrust forces generated by the input member.

SUMMARY OF THE INVENTION

The operator of this invention utilizes a single input shaft having threaded means thereon to cause rotation of a pair of spaced parallel screws in opposite directions. The screws each carry a nut which is linked to a lever, which levers are fixed to opposite sides of a plug or output member. Thus, on rotation of the input shaft, the output member is simultaneously twisted by said nuts moving in opposite directions. Thus, plural forces are transmitted back to the input shaft, but are equal and oppositely directed, thereby removing the necessity for providing a thrust bearing to the input member.

BRIEF DESCRIPTION OF THE DRAWINGS

FIG. 1 is a somewhat generalized perspective representation of the drive system used in this device;

FIG. 2 is a plan of the operator, the cover being removed away for clarity; and

FIG. 3 is a front elevation, further parts of the housing being broken and housing side removed.

DESCRIPTION OF A PREFERRED EMBODIMENT

The structurally inventive features are best shown in FIG. 1, the numerals used in that schematic presentation are carried through to FIGS. 2 and 3.

A housing may be provided having end plates 1 and 10, cover 16 and base 32. A pair of spaced parallel guide plates 3 are affixed to the upper surface of base 32, and a similar pair of oppositely directed guides plates 63 are provided the lower surface of cover 16. A yoke assembly, generally shown at 35, may be rotatably received within apertures provided cover 16 and base 32, in a known manner. Keying means 66 permit a valve stem to be secured, for rotation to the yoke assembly. Each of the two pairs of guide members 3 and 63 are longitudinally slotted as at 3a and 63a, respectively, for sliding receipt of a guide member hereinafter described.

Yoke assembly 35, or torque plug, possesses upper and lowers pairs of oppositely directed ears 75, 75a and 76, 76a, respectively.

A pair of actuating screws 2 are positioned on opposite sides of yoke assembly 35, and have their ends rotatably mounted in bushings provided end plates 1 and 10. Each of the actuating screws extend approximately intermediate and parallel to its respective upper and lower guide members. It should be noted that both of screws 2 are of the same turn, for example, having right handed threads. Each of screws 2 is keyed at one unthreaded end to a worm gear 22 and 30 (only gear 22 being shown in FIG. 3, the other being therebehind). These worm gears or wheels are of opposite turn, i.e., for example, member 22 being right handed and 30 being left handed. Collars are pinned to the unthreaded ends of screws 2 intermediate end plate 10 and the respective worm gears 22, 30.

Drive shaft 28 extends throughout the width of the housing, and is rotatably supported by drive shaft end plates 9. This shaft has near its opposite ends, worms 6, 31 keyed thereto, and fixed axially relative thereto by virtue of collars 7, said collars being positioned relative to the shaft by roll pins such as indicated by numeral 8. Worms 6, 31 are of opposite turns, for example, member 6 being left handed and 31 right handed. Worms 6, 31 are in mesh, respectively, with worm gears 30 and 22, respectively, each of the meshing worm and worm gear being of the same turn. Shaft 28 thus may fully move axially during operation.

Returning now to spaced ears or lugs 75, 75a and 76, 76a on yoke 35, each of said ears is apertured along its axis as indicated in FIG. 2. Nuts 20 threadedly engage with and may axially move along each of screws 2. The housing of each of said nuts 20 possess upper and lower guides 14, which may be anchored to the nut by fasteners 4, said guides extending upwardly a sufficient distance to pass through and align the apertures in the associated yoke ears and within and be guided along and within slots 3a and 63a in each of the guide or rail members 3 and 63 (recall there are a pair of each of said guide members).

Consider now the performance of this operator. Manual or other power sources may cause rotation of drive shaft 28, for power input. Yoke 35 may be keyed to a driven member, such as a valve stem to produce, as output, the desired rotation. It is desirable to produce a torsional output without side loads or forces by the output member, thus reducing friction and resulting inefficiency. This may permit eliminating the necessity for bearings around the output member or yoke. On rotating shaft 28, clockwise, for example, right hand and left hand worms 31 and 6 affixed to the shaft will cause rotation in opposite directions of worm wheels 22, 30. This results in the associated screws 2 also rotating in opposite directions from each other. Inasmuch as the pair of screws 2 are threaded in the same direction, one of the nuts 20 associated will move away from shaft 28 and along its screw, while the other of nuts 20 will move toward shaft 28. The upper and lower guide members possessed by each of the nuts will ride through the slots contained by their associated guide plates. Of course, their motion, that of the guide members, turns or produces a torque in yoke or torque plug 35, by virtue of their passing through apertures in the yoke ears. Thus, the forces applied to the inner wall of the yoke ear slots, and thereby to the yoke are in equal and opposite direction, i.e., one point is being pushed and an opposite point is being pushed. The counterforce then applied to the nuts are transmitted back to the worm gears or wheels and worms and to the common shaft. But these counterforces are equal and opposite. Thus, there is no thrust bearing provided the input shaft. Were only one side of the yoke connected to a screw, on the input shaft being turned, a thrust bearing would be required.

Although only a single embodiment has been described relative to a single use, it should be obvious that numerous modifications and applications would be possible by one skilled in the art without departing from the spirit of the invention, the scope of which is intended to be limited only by the following appended claims.

What is claimed is:
1. In an operator, the combination of:
an input member comprising a drive shaft having spaced threaded portions;
a rotatable output member having a portion therein for receiving a portion of a valve;
force transmission members including a pair of spaced screws substantially perpendicular to said drive shaft, and each being in threaded communication with one of said threaded portions of said drive shaft;
means linking said force transmission members to said output member, said linking means including a nut rotatably and longitudinally slidably positioned on each of said screws and connected to said output member.

2. The operator of claim 1 wherein said spaced threaded portions of said input member are two in number and are of the opposite turn.

3. The operator of claim 2 wherein said screws of said force transmission members are of the same turn.

4. The operator of claim 1 wherein said linking means includes slotted portions of lugs extending from opposite sides of said valve receiving portion of said output member, and guides extending from each of said nuts through said lug slots of said output portion, said guides exerting equal but oppositely directed forces against said oppositely disposed slotted portions of said output member on said input member being operatively rotated.

5. The operator of claim 4 and including guide receiving slots directing motion of said guides within the housing of such operator.

References Cited

UNITED STATES PATENTS

| | | | |
|---|---|---|---|
| 951,462 | 2/1910 | Southworth | 74—89.15 |
| 2,173,488 | 9/1939 | Tandler et al. | 74—58 |
| 2,483,121 | 9/1949 | Bourassa | 74—58 |
| 3,190,251 | 6/1965 | Kumpf | 74—89.15 |

FRED C. MATTERN, JR., Primary Examiner

W. S. RATLIFF, JR., Assistant Examiner

U.S. Cl. X.R.

74—59, 424.8